Jan. 19, 1937.   F. C. HANKE ET AL   2,068,410
PHOTOGRAPHIC CAMERA AND PROJECTOR APPARATUS
Filed Dec. 11, 1933    2 Sheets-Sheet 1
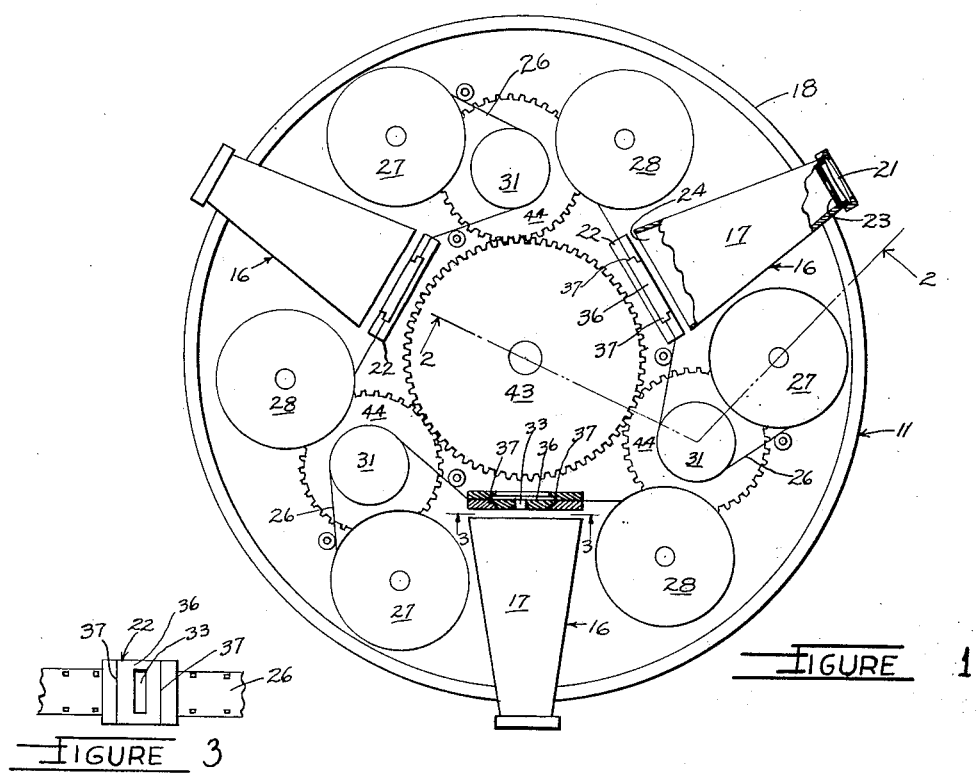
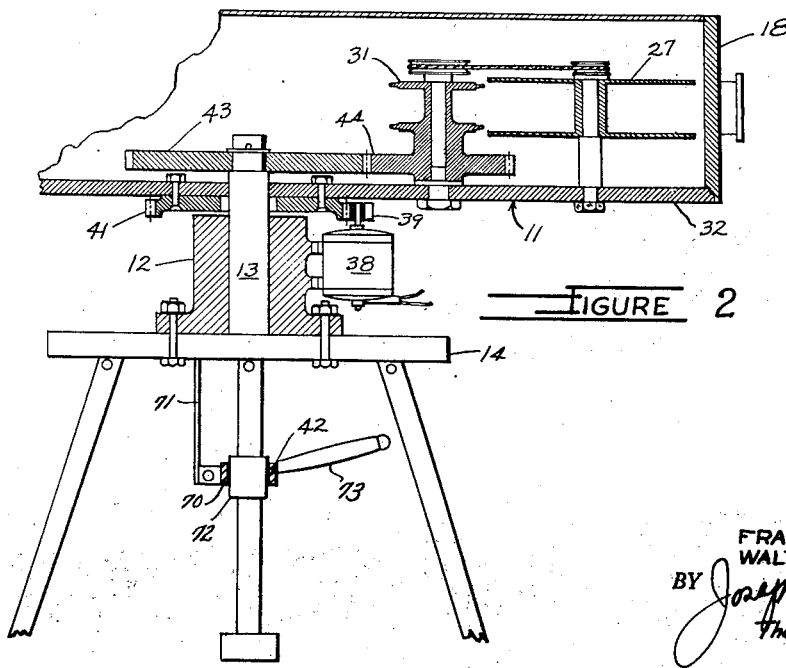
INVENTORS.
FRANK C. HANKE
WALTER B. RHEA
BY Joseph B. Gardner
Their ATTORNEY.

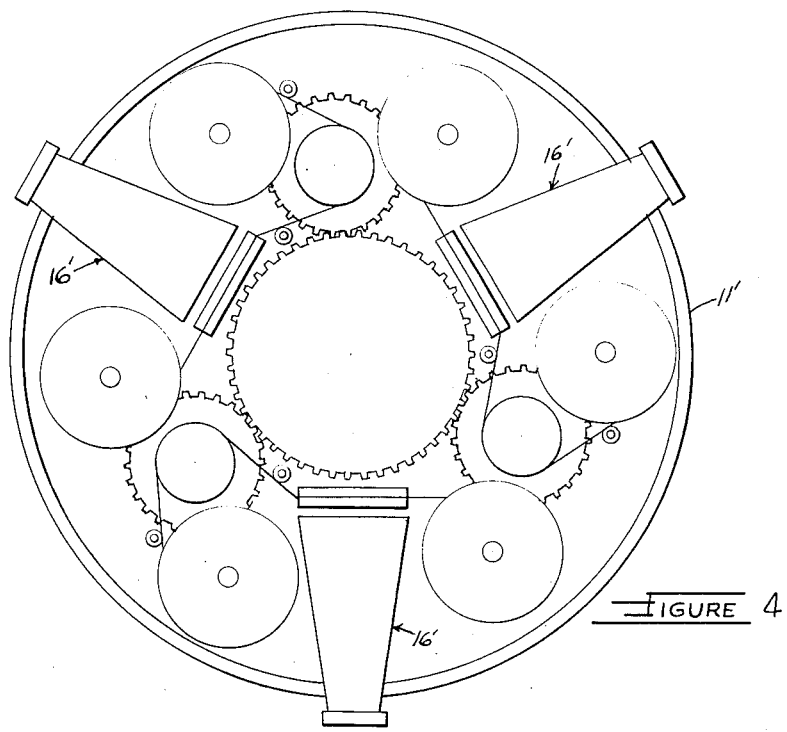
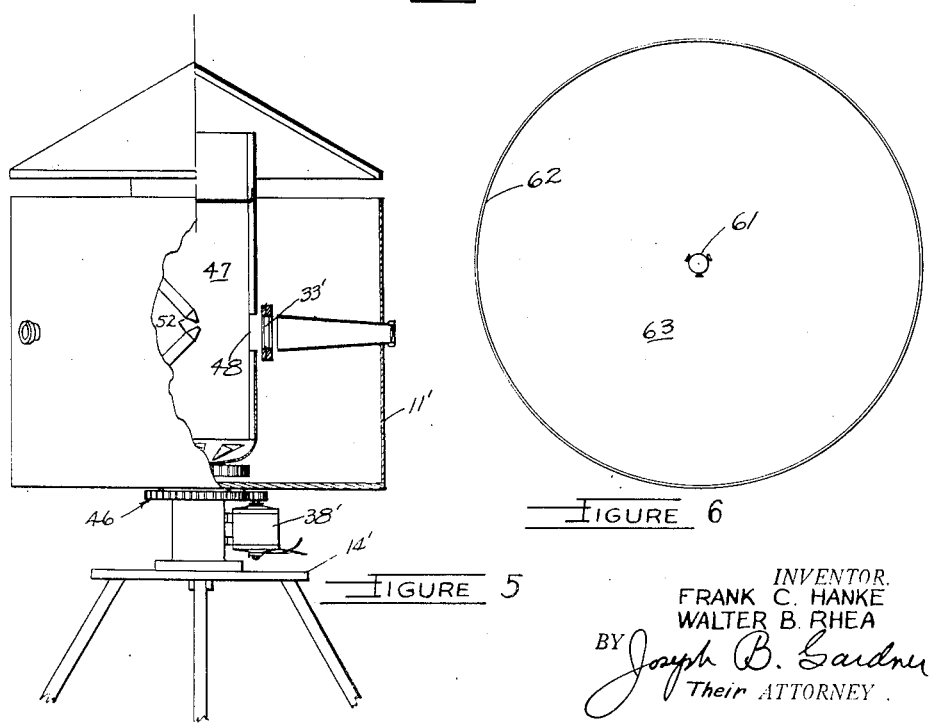

Patented Jan. 19, 1937

2,068,410

UNITED STATES PATENT OFFICE 2,068,410

PHOTOGRAPHIC CAMERA AND PROJECTOR APPARATUS

Frank C. Hanke and Walter B. Rhea, Oakland, Calif.

Application December 11, 1933, Serial No. 701,900

3 Claims. (Cl. 88—16)

The invention relates to photographic apparatus and more particularly to cameras and projectors arranged for recording and showing so-called "panoramic" and "motion picture" views.

An object of the invention is to provide an apparatus of the character described which will scan a panoramic view of a complete 360 degrees of arc continuously and with such rapidity that successive recordings of every portion of the panorama will occur within an interval of time affording an appearance of continuity to the eye.

Another object of the invention is to provide a projector mechanism that will use film exposed as above described and which may be so synchronized with the recording device as to project the photographed images onto a screen in a manner affording a reconstruction of the original panoramic view having the successive recorded portions projected onto a single portion of the screen and with such rapidity as to cause successive progressions of movements in the recorded portions to appear as if continuous.

A further object of the invention is to provide in combination with a projector mechanism of the character described, a cylindrical screen which is arranged to surround the audience and on which may be projected a complete panoramic view. By means of this arrangement it will be understood that a member of the audience will be completely surrounded by a full panoramic image in which the various objects would appear exactly the same, as to angular position and distance, as they would be were he viewing the entire panorama scene from the point about which the film was recorded.

Yet another object of the invention is to provide an apparatus of the character described in which a plurality of recording and projecting devices may be so synchronized as to enable their embodiment in a single recording or projecting unit.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of the camera or recording apparatus with the top thereof removed.

Figure 2 is a vertical sectional view of a portion of the apparatus shown in Figure 1 and taken substantially on the plane of the line 2—2 of Figure 1.

Figure 3 is an enlarged elevation of the aperture plate and holder for the film.

Figure 4 is a plan view of the projecting apparatus with the top cover therefor removed.

Figure 5 is an elevation of the apparatus shown in Figure 4 with a portion of the device broken away and shown in section.

Figure 6 is a plan view of a theater showing the screen and projecting machine and intermediate space for the audience.

With reference more particularly to the drawings, we have shown in Figures 1 to 3 a camera recording mechanism which is constructed in accordance with my invention. This device comprises a head casing 11 which is rotatably mounted, as by means of a base support 12 and an axial shaft 13, on a tripod 14. Mounted in the head casing for rotation therewith is a plurality of camera units 16 each comprising a focusing barrel 17 extending radially outward and through the outer wall 18 of the casing. A lens 21 is carried adjacent the outer end of the barrel for gathering the light rays incident thereon and focusing the same on a film holding member 22 positioned directly behind the inner open end 24 of the barrel, the light intensity being reduced by the interposition of an apertured plate 23 behind the lens. Means for feeding a film 26 through the member 22 for exposure here include winding and unwinding reels 27 and 28 and a driven film cog 31 each mounted on upright bearing supports carried by the base 32 of the head casing.

As will be understood, rotation of the camera units will provide a progressive scanning of the horizon completely around the center of rotation of the head casing and cause the successive recording on the film of objects brought into view during such scanning. As an important feature of our invention we have arranged for the movement of film past the rear of the focusing barrel in exact conformity with the movement of the projected image caused by rotation of the principal axis of the barrel and lens. As a result, at least in part, of this synchronization of the movement of the image and film, it has been found that the need for the usual shutter may be dispensed with. Preferably the width of the film exposed is confined to a relatively narrow scanning element and to this end the film holding member 22, as clearly shown in Figures 1 and 3, is arranged to completely cover the film carried thereby except for a narrow vertically extending slot portion 33 disposed centrally of the focusing area. As will of course be clear the speed at which the film progresses across the slot will determine the exposure interval of the film and provide automatically in this manner for a shutter action. To accommodate the camera for use in different intensities of light, the width of the exposure or scanning slot is preferably selective, and in accordance therewith we have here provided the portion of the member 22 containing the slot, in the form of a separate plate 36 which is removably held as by guide portions 37 in the member 22. Thus a plurality of such plates may be provided having various sized slot openings for affording ready selection of the size of opening desired.

The invention, however, in addition provides for the combining with a panoramic exposure the recording of motion picture views. This latter feature of the invention is effected by rotating the camera head at such a speed that the interval of time between successive exposures of a portion of the panorama will not exceed the image retention period of the human eye of about one sixteenth of a second. Worded in another way, each element of the panorama is recorded at constant intervals preferably falling between one sixteenth and one-twenty-fourth of a second, which range corresponds to the usual number of picture changes of ordinary motion picture equipment. As a result of this constant and rapid rotation every moving object in the entire panorama is photographed with such periodic rapidity as to appear to the eye continuous when the film is projected in a manner such as hereinafter described. In accordance with the above it will be understood that the greater the number of camera units in the casing head the slower may be the latter's rotation. Thus for but a single camera unit, the head would need rotate at least sixteen revolutions per second. Three units as here shown reduce the speed to about 5⅓ revolutions per second, while a battery of 16 units would reduce the speed to one revolution per second.

Means for rotating the camera head and progressively feeding the film here comprises an electric motor 38 preferably of the synchronous type which is mounted on the head base support 12 and is provided with a pinion 39 which engages and drives an annular gear 41 secured to the bottom of the head casing. Preferably the shaft 13 is floatingly carried by the head casing and tripod support and is provided at its free lower end with a manually operated brake 42 which permits of holding the shaft against, or releasing the same to accord, rotation thereof with the head casing. The brake may be of substantially any form desired and here consists of a contractible brake shoe 70 fixedly supported to the tripod by a bracket 71 and mounted around an enlarged cylindrical portion 72 on the shaft 13. Contraction of the brake shoe about the rotatable shaft portion 72 is effected by means of a hand lever 73 which is pivoted to the supporting bracket 71 and provided with cam means (not shown) for causing a contraction of the brake shoe on movement of the lever in one direction and a release of the shoe on movement of the lever in an opposite direction. Carried by the upper end of the shaft and positioned within the head casing is a gear 43 which is arranged to engage and drive a gear 44 on each of the film cogs 31. Thus when the shaft 13 is released to rotate with the head casing, no relative movement between the gears 43 and 44 can result. However upon stopping the shaft 13, the gears 44 on the film cogs will be caused to roll around the central gear 43 to produce a movement of film past the exposing apertures. Accordingly in operation the head casing is first brought up to speed and thereafter the recording may be started or stopped at the will of the operator by his operation of the brake 42 of the shaft.

Relative sizes of the gears 43 and 44, as will be understood, determine the relative speed of the film past the aperture, which speed, as hereinbefore mentioned, should correspond to the movement of the image with respect to the aperture. This latter movement we have found to be a function of the focal length of the lens, the movement of the image for one revolution of the camera head being equal to 2 x pi x focal length of lens. Accordingly in instances where lenses of different focal lengths are to be used, such as for distant and close up work, corresponding sizes of gear ratios for driving the film cogs are employed.

In Figures 4 and 5 we have disclosed a projector apparatus which is arranged to show the films recorded by the above described camera unit. The apparatus here shown comprises a support 14' on which is rotatably mounted a head casing 11' in which is contained a plurality of projector units 16' and film feeding mechanisms, the whole being arranged for rotation by a motor 38' and associated gear arrangement 46 all in the manner described in connection with the camera apparatus. As will be understood in the case of the projector, light is passed through the film and from the apparatus for showing on a screen and to this end a central light generating chamber 47, having light passages 48 registering with apertures 33' of the projector units, is arranged axially of and for rotation with the head casing. Preferably a circulation of air through the chamber is maintained for dissipating the heat produced therein and as here shown the top and bottom of the chamber 47 are open to the outside of the head casing for allowing admission and escape of air to and from the chamber. To further assist such circulation the lower ends of the chamber side walls are inwardly curved to define fan blades which on rotation of the chamber and casing serve to draw air into the base of the chamber. As will be understood any suitable light generating means may be provided in the chamber such as the arc light 52 here shown.

As in other photographic apparatus there is a certain reversible similarity in operation between the projector and camera. In the instant case the speed of rotation of the head casings, the number of units, and the relative movement of the film is the same. These similarities, however, effect a novel cooperating action between the camera and projector for since in "taking" a scene the film moves together with and records the image in the camera and in projection the projected image shown on the screen is a direct result of the recorded image, it will be clear that each panorama portion shown on successive revolutions of the projector head casing will be so synchronized as to fall one on the other to produce the effect on the eye as being a continuous showing.

An important feature of the projection apparatus is the provision of using in connection therewith a cylindrical screen extending completely around the projector and arranged to have projected thereon an entire panoramic view of 360 degrees of arc. This arrangement is illustrated in Figure 6 wherein a projector 61 is positioned at the center of a circular screen 62 and affording intermediate the projector and screen an annular space 63 for seating an audience. In this manner different portions of the view constructed on the screen will appear to the audience to be exactly the same as to spacing and distance as the original scene viewed from the point of photographing. Thus the attention of a member of the audience need not be confined to any small view but may wander around the panorama seeking the most interesting section. Also as will of course be clear only a portion of the circular screen need be used if desired while the light affording the remainder of the panorama may be dissipated at the projector by projecting through a limited sized opening or absorbed over the remaining portion of the screen.

We claim:

1. In a photographic apparatus of the character described, a camera arranged for rotation displacing the principal axis thereof through substantially 360 degrees for recording on film a complete panoramic view, means for periodically completing a revolution of said axis at intervals approximating the image retention period of the eye, means for moving the film across the focal plane of the camera in synchronism with the movement of the projected image thereacross, and means to optionally cause or stop said film movement during rotation of the camera.

2. The method of recording a motion picture panoramic view which consists in forming an image of an arc element of said view, positioning a film in the focal plane of said image, displacing the principal axis of the image forming means to form a moving image of successively adjacent arc elements around a complete panorama view of 360°, advancing said film across said principal axis and said focal plane in accordance with the movement of said image, and causing said rotation at a speed producing a periodic recording of each arc element within the image retention period of the eye.

3. The method of recording a motion picture panoramic view which consists in focusing an image of an element of said view on a recording film, angularly displacing the line of said image and element to form a moving image of successive elements of said view, advancing said film in accordance with the movement of said image so that the latter will be impressed on successive portions of unexposed film, and in moving said line with an angular velocity causing said line to successively periodically pass through each of the aforesaid view elements within the image retention period of the eye.

FRANK C. HANKE.
WALTER B. RHEA.